United States Patent
Nishihira et al.

(10) Patent No.: US 11,092,232 B2
(45) Date of Patent: Aug. 17, 2021

(54) PLANETARY GEAR REDUCTION DEVICE

(71) Applicant: KAWASAKI JUKOGYO KABUSHIKI KAISHA, Kobe (JP)

(72) Inventors: Taku Nishihira, Kakogawa (JP); Hirofumi Akahori, Akashi (JP); Takunobu Nishida, Kobe (JP); Mamoru Yoshitomi, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/324,688

(22) PCT Filed: Jul. 28, 2017

(86) PCT No.: PCT/JP2017/027431
§ 371 (c)(1),
(2) Date: Feb. 11, 2019

(87) PCT Pub. No.: WO2018/030177
PCT Pub. Date: Feb. 15, 2018

(65) Prior Publication Data
US 2019/0186623 A1 Jun. 20, 2019

(30) Foreign Application Priority Data
Aug. 12, 2016 (JP) .............................. JP2016-158496

(51) Int. Cl.
*F16H 1/28* (2006.01)
*F16H 57/08* (2006.01)

(52) U.S. Cl.
CPC ............. *F16H 57/082* (2013.01); *F16H 1/28* (2013.01); *F16H 1/2827* (2013.01); *F05D 2260/40311* (2013.01)

(58) Field of Classification Search
CPC ........ F16H 57/082; F16H 1/2827; F16H 1/48; F16H 1/2809; F05D 2260/40311
(Continued)

(56) References Cited

U.S. PATENT DOCUMENTS

| 8,986,160 B2 | 3/2015 | Altamura et al. |
| 2003/0162630 A1* | 8/2003 | Poulin .................. F16H 57/082 475/331 |

(Continued)

FOREIGN PATENT DOCUMENTS

| CA | 2682454 A1 | 10/2010 |
| CN | 105637259 A | 6/2016 |

(Continued)

*Primary Examiner* — Roger L Pang
(74) *Attorney, Agent, or Firm* — Sughrue Mion, PLLC

(57) ABSTRACT

An output frame is connected to a portion of a radially outer portion of a carrier, the portion being closer to a front plate than to a rear plate. The carrier has a first region as an external force transmission path between front pin support surfaces and the output frame, and a second region as the external for transmission path between rear shaft support surfaces and the output frame, and a stiffness with respect to a twist force of the first region and a stiffness with respect to the twist force of the second region are equal to each other. In the front plate and the rear plate, a stiffness with respect to a radial tensile force applied to the front pin support surfaces and a stiffness with respect to the radial tensile force applied to the rear shaft support surfaces are equal to each other.

11 Claims, 9 Drawing Sheets

(58) Field of Classification Search
USPC .......................................... 475/331, 346, 347
See application file for complete search history.

(56) References Cited

U.S. PATENT DOCUMENTS

| | | |
|---|---|---|
| 2011/0105270 A1 | 5/2011 | Matsuoka et al. |
| 2012/0028756 A1* | 2/2012 | Lopez .................. F16H 57/082 |
| | | 475/346 |
| 2016/0238126 A1 | 8/2016 | Beck et al. |
| 2019/0234510 A1* | 8/2019 | Brillon ...................... F02C 7/36 |

FOREIGN PATENT DOCUMENTS

| | | |
|---|---|---|
| DE | 10 2014 205979 A1 | 10/2015 |
| EP | 2 241 780 A2 | 10/2010 |
| EP | 2 532 928 A1 | 12/2012 |
| JP | 2011-094714 A | 5/2011 |
| WO | 2015/052437 A1 | 4/2015 |

* cited by examiner

PLANETARY GEAR REDUCTION DEVICE

CROSS REFERENCE TO RELATED APPLICATIONS

This application is a National Stage of International Application No. PCT/JP2017/027431 filed Jul. 28, 2017, claiming priority based on Japanese Patent Application No. 2016-158496 filed Aug. 12, 2016.

TECHNICAL FIELD

The present invention relates to a planetary gear reduction device including a rotatable carrier.

BACKGROUND ART

In a planetary gear reduction device used in a driving force transmission mechanism in aircraft or the like, in some cases, planetary pins are bent due to driving torque applied to a carrier, parallelism of planetary gears with respect to a sun gear and a ring gear is reduced, and misalignment of meshing of the gears occurs. As a solution to this, in the planetary gear reduction device disclosed in Patent Literature 1, a front plate of the carrier, which supports one end portions of the planetary pins, is provided with a hollow space to reduce stiffness of the front plate. In this way, bending deformation of the planetary pins is suppressed.

CITATION LIST

Patent Literature

Patent Literature 1: Japanese Laid-Open Patent Application Publication No. 2011-94714

SUMMARY OF INVENTION

Technical Problem

In the planetary gear reduction device disclosed in Patent Literature 1, in a case where the carrier is rotatable (e.g., in the case of a planetary gear reduction device), the driving torque transmitted to the carrier increases. In particular, in a case where a location (force application point of the carrier) from which the driving torque is output from the carrier is closer to the front plate, imbalanced twist deformation may occur in the carrier due to a torque reaction force, the planetary pins may be tilted (inclined), and misalignment may occur.

In the planetary gear reduction device including the rotatable carrier, a centrifugal force of the planetary gears and the planetary pins is applied to the carrier. In the configuration disclosed in Patent Literature 1, the stiffness of the front plate is made lower than that of a rear plate. Therefore, due to the centrifugal force, radially outward tensile deformation of the front plate occurs. For this reason, the planetary pins may be tilted (inclined) and misalignment may occur due to the centrifugal force.

In view of the above-described circumstances, an object of the present invention is to prevent misalignment due to the torque transmitted to the carrier and misalignment due to the centrifugal force of the planetary gears and the planetary pins, in the planetary gear reduction device including the rotatable carrier.

According to a first aspect of the present invention, a planetary gear reduction device comprises a sun gear which receives a driving force as an input, the sun gear having external teeth; a plurality of planetary gears having external teeth which mesh with the sun gear; a ring gear having internal teeth which mesh with the plurality of planetary gears; a rotatable carrier including: a front plate including a plurality of front pin support surfaces supporting first end portions of a plurality of planetary pins, the planetary pins being axes of rotation of the plurality of planetary gears, a rear plate including a plurality of rear shaft support surfaces supporting second end portions of the plurality of planetary pins, and a coupling member coupling the front plate to the rear plate; and an output frame connected to the carrier to output the driving force, wherein the output frame is connected to a portion of a radially outer portion of the carrier, the portion being closer to the front plate than to the rear plate, wherein the carrier has a first region as an external force transmission path between the front pin support surfaces and the output frame, and a second region as the external force transmission path between the rear shaft support surfaces and the output frame, and a stiffness with respect to a twist force of the first region and a stiffness with respect to the twist force of the second region are equal to each other, and wherein in the front plate and the rear plate, a stiffness with respect to a radial tensile force applied to the front pin support surfaces and a stiffness with respect to the radial tensile force applied to the rear shaft support surfaces are equal to each other (equalized).

In accordance with this configuration, the output frame is connected to a portion of the radially outer portion of the carrier, the portion being closer to the front plate than to the rear plate. In a case where no measures are taken, a torque reaction force from the output frame to the carrier, which is generated at the front plate side, is more than that generated at the rear plate side. However, the stiffness with respect to the twist force of the first region and the stiffness with respect to the twist force of the second region are equal to each other. Therefore, a twist deformation generated in the carrier due to the torque transmitted to the carrier is balanced when viewed from the planetary pins, and tilting (inclination) of the planetary pins is prevented. In a case where the twist stiffness of the first region and the twist stiffness of the second region are equalized in the carrier, the twist stiffness of the front plate and the twist stiffness of the rear plate are different from each other. However, in the front plate and the rear plate, the stiffness with respect to the radial tensile force applied to the front pin support surfaces and the stiffness with respect to the radial tensile force applied to the rear shaft support surfaces are equal to each other (equalized). This makes it possible to prevent tilting (inclination) of the planetary pins due to the centrifugal force. As a result, in the planetary gear reduction device including the rotatable carrier, it becomes possible to prevent misalignment due to the torque transmitted to the carrier and misalignment due to the centrifugal force of the planetary gears and the planetary pins.

The front plate may include an outer portion which is radially outward of centers of the plurality of planetary pins, the rear plate includes an outer portion which is radially outward of the centers of the plurality of planetary pins, and the outer portion of the front plate includes a flexible structure portion which makes the stiffness with respect to the twist force lower than that of the outer portion of the rear plate, and the stiffness with respect to the radial tensile force of a region of the front plate, the region being inward of the flexible structure portion, may be higher than that of a region of the rear plate, the region being radially inward of a portion of the rear plate, the portion conforming in radial position to the flexible structure portion.

In accordance with this configuration, the outer portion of the front plate includes the flexible structure portion which makes the twist stiffness lower than that of the outer portion of the rear plate. With the flexible structure portion, the twist stiffness of the first region and the twist stiffness of the second region can be easily equalized. The tensile stiffness of the outer portion of the front plate is reduced because of the flexible structure portion provided at the outer portion of the front plate. However, by increasing the tensile stiffness of a region of the front plate, the region being radially inward of the flexible structure portion, it becomes possible to easily realize a configuration in which the stiffness of the front plate with respect to the centrifugal force and the stiffness of the rear plate with respect to the centrifugal force are equal to each other. In brief, the twist deformation can be substantially prevented by the radially outer portion of the carrier, and the misalignment due to the centrifugal force can be substantially prevented by the radially inner portion of the carrier. Thus, designing for prevention of the twist information and designing for prevention of the misalignment can be easily separately performed.

At least one of a non-opening rate, a non-thin region rate, a minimum thickness, and a material stiffness, of the outer portion of the front plate, may be made smaller than that of the outer portion of the rear plate, to form the flexible structure portion.

In accordance with this configuration, the flexible structure portion can be easily formed in the front plate.

A non-opening rate, a non-thin region rate, or a minimum thickness of the outer portion of the front plate may be smaller than that of the outer portion of the rear plate. The front plate may include an inner portion which is radially inward of centers of the plurality of planetary pins, the rear plate includes an inner portion which is radially inward of the centers of the plurality of planetary pins, and the non-opening rate, the non-thin region rate, or the minimum thickness of the inner portion of the front plate may be larger than that of the inner portion of the rear plate.

This makes it possible to suitably realize reduction of the weight of the carrier and equalization of the stiffness of the front plate and the stiffness of the rear plate.

A region of the front plate, the region having a highest stiffness with respect to the radial tensile force, may be located radially inward of a region of the rear plate, the region having a highest stiffness with respect to the radial tensile force. For example, in a case where the front plate includes a plurality of regions which are different in thickness, the largest thickness portion of the plurality of regions corresponds to the region with a highest stiffness with respect to the radial tensile force.

In accordance with this configuration, even in a case where the tensile stiffness of the first region of the front plate is reduced, the stiffness with respect to the radial tensile force of the front plate can be easily increased. As a result, designing and manufacturing can be made easier.

Each of the front plate and the rear plate may have a center opening through which a rotational axis line of the carrier passes, and the center opening of the front plate may be smaller than the center opening of the rear plate.

In accordance with this configuration, even in a case where the tensile stiffness of the first region of the front plate is reduced, the stiffness with respect to the radial tensile force of the front plate can be easily increased. As a result, designing and manufacturing can be made easier.

The front plate may include a plate portion crossing a rotational axis line of the carrier, in a center portion of the front plate.

In accordance with this configuration, since the front plate is not formed with the center opening crossing the rotational axis line of the carrier, lubricating oil can be easily reserved in the inner space of the carrier. Since the front plate is not formed with the center opening, it becomes possible to efficiently improve the radial tensile force of the front plate. The reduction of the weight of the front plate can be suitably realized.

The output frame may be connected to a portion of the coupling member, the portion being closer to the front plate, the coupling member may include a front portion provided at a location that is closer to the front plate than to a location where the coupling member is connected to the output frame, and a rear portion provided at a location that is closer to the rear plate than to the location where the coupling member is connected to the output frame, and the front portion may be configured to make the stiffness with respect to the twist force lower than that of the rear portion.

In accordance with this configuration, the stiffness of the first region and the stiffness of the second region can be easily equalized in the carrier. Since the coupling member serves to reduce the twist stiffness in the first region of the carrier, designing of the front plate can be simplified.

The front plate and the rear plate may have the same shape.

In accordance with this configuration, the front plate and the rear plate can be easily designed.

Advantageous Effects of Invention

In accordance with the present invention, it becomes possible to prevent misalignment due to the torque transmitted to the carrier and misalignment due to the centrifugal force of the planetary gears and the planetary pins, in the planetary gear reduction device including the rotatable carrier.

DESCRIPTION OF EMBODIMENTS

Hereinafter, the embodiments will be described with reference to the drawings. For easier understanding of the description, a side which is closer to an output frame 7 of a planetary gear reduction device 1 in the direction of a rotational axis line will be referred to as "front" and a side which is distant from the output frame 7 will be referred to as "rear". However, front-rear relation is not limited to this.

Embodiment 1

Figure 1:
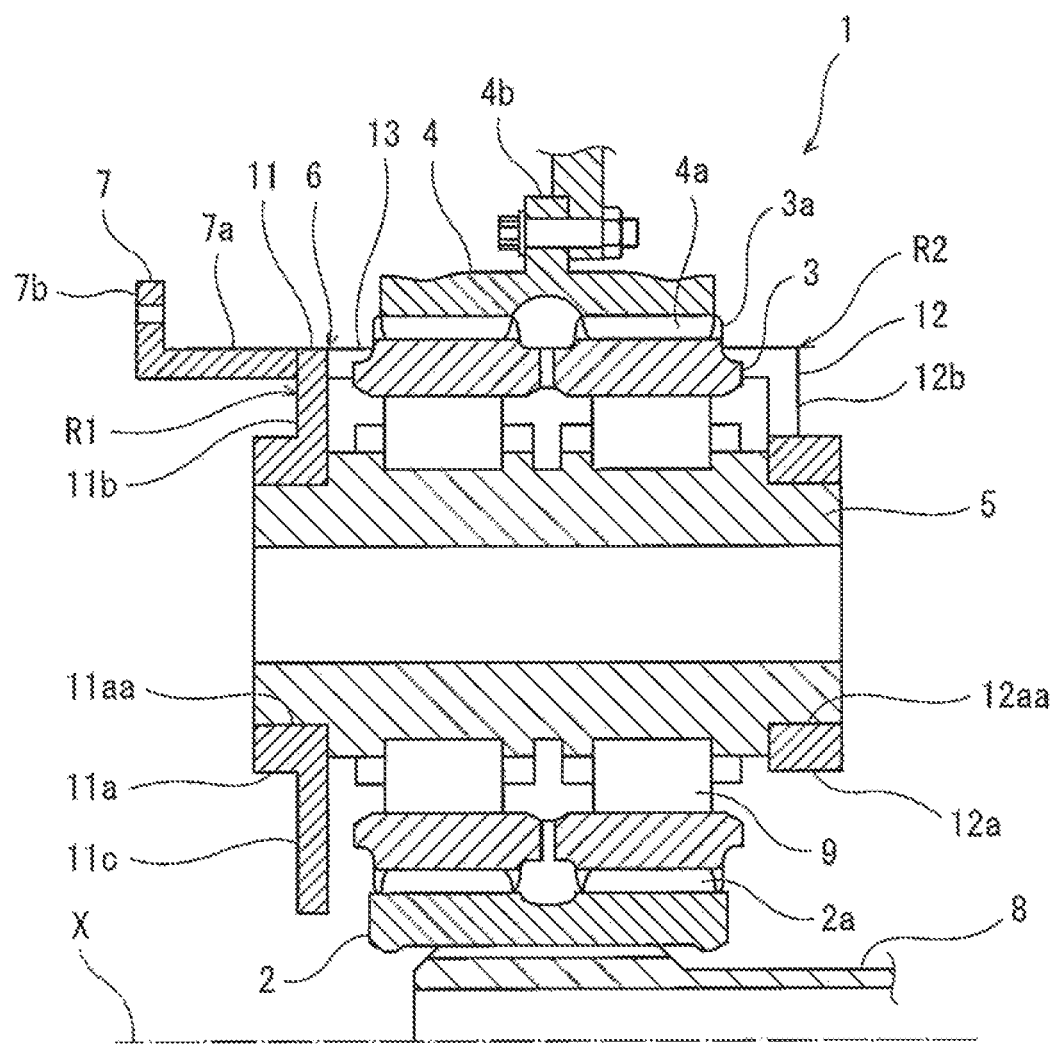
FIG. 1 is a partial cross-sectional view of a planetary gear reduction device according to Embodiment 1.

FIG. 1 is a partial cross-sectional view of a planetary gear reduction device 1 according to Embodiment 1. In the present embodiment, the planetary gear reduction device 1 is used as, for example a driving force transmission mechanism (speed reduction mechanism) of an aircraft engine or the like. As shown in FIG. 1, the planetary gear reduction device 1 includes a sun gear 2, a plurality of planetary gears 3, a ring gear 4, a plurality of planetary pins 5, a carrier 6, and the output frame 7.

The sun gear 2 has external teeth 2a. The sun gear 2 is mounted on an input shaft 8 by fitting or spline coupling so that the sun gear 2 is rotatable together with the input shaft 8. A rotational driving force is transmitted from an engine to the input shaft 8. The plurality of planetary gears 3 include external teeth 3a which mesh with the external teeth 2a of the sun gear 2. The plurality of planetary gears 3 are disposed to be equally spaced apart from each other (positioned at equidistant locations) around an axis line X of the sun gear 2. The ring gear 4 includes internal teeth 4a which mesh with the external teeth 3a of the planetary gears 3, and a fastening flange 4b. The ring gear 4 is unrotatably fastened at the flange 4b. Note that the flange 4b may be omitted so long as the ring gear 4 is unrotatably fastened (fixed). The plurality of planetary pins 5 are rotatably inserted into the plurality of planetary gears 3 via bearings 9, respectively, to support the plurality of planetary gears 3. Each of the planetary gears 3 is constituted by double teeth rows. Alternatively, each of the planetary gears 3 may be a single teeth row, or three or more teeth rows.

The carrier 6 includes the front plate 11, the rear plate 12, and a plurality of coupling members 13. The front plate 11 includes a plurality of front pin support portions 11a formed with front pin support surfaces 11aa supporting the first end portions of the plurality of planetary pins 5, respectively. The rear plate 12 includes a plurality of rear shaft support portions 12a formed with rear shaft support surfaces 12aa supporting the second end portions of the plurality of planetary pins 5, respectively. Each of the front pin support portions 11a and the rear shaft support portions 12a has a cylindrical (tubular) shape. The front pin support surfaces 11aa and the rear shaft support surfaces 12aa are tubular surfaces. Alternatively, each of the front pin support portions 11a and the rear shaft support portions 12a may not have the cylindrical shape and may have a, for example, tubular shape with a rectangular cross-section. The planetary pins 5 are inserted into the front pin support portions 11a and the rear shaft support portions 12a. The front pin support portions 11a and the rear shaft support portions 12a may not protrude with a tubular shape in a direction of the axis line X so long as the front pin support surfaces 11aa and the rear shaft support surfaces 12aa have a tubular shape. The front pin support portions 11a and the rear shaft support portions 12a may be coplanar (flush) with surfaces (e.g., surfaces of an outer portion and an inner portion (described later), facing in the direction of the axis line X) adjacent to them.

Each of the plurality of coupling members 13 has a post shape. The plurality of coupling members 13 couple the radially outer end portion of the front plate 11 to the radially outer end portion of the rear plate 12. The plurality of coupling members 13 are arranged with gaps G (see FIG. 2) in the circumferential direction around the axis line X. The planetary gears 3 are exposed through the gaps G Specifically, the internal teeth 4a of the ring gear 4 mesh with the external teeth 3a of the planetary gears 3 through the gaps G each of which is between adjacent coupling members 13. Note that the shape of the coupling members is not limited so long as the gaps G through which the planetary gears 3 are exposed.

The output frame 7 is connected to the radially outer portion of the carrier 6. The output frame 7 is configured to output a rotational driving force from the carrier 6. The output frame 7 is connected to a portion of the radially outer portion of the carrier 6, the portion being closer to the front plate 11 than to the rear plate 12. In the present embodiment, the output frame 7 is connected to the front plate 11. The output frame 7 includes a tubular portion 7a protruding in the direction of the axis line X from an end surface of the outer peripheral portion of the carrier 6, the end surface being closer to the front frame 11, and a flange 7b protruding radially outward from a protruding end of the tubular portion 7a. The output frame 7 is integrated with the carrier 6. The radial position of the tubular portion 7a conforms to those of the coupling members 13. A driven member (e.g., shaft of a fan) (not shown) is secured to the flange 7b. The shape of the output frame 7 is not particularly limited so long as the output frame 7 is secured to the driven member so that the driving force can be transmitted to the driven member. The output frame 7 may be fastened to the carrier 6 by a fastening member.

In the planetary gear reduction device 1, the rotational driving force from the input shaft 8 is input to the sun gear 2 in a state in which the ring gear 4 is unrotatably fastened (fixed), the planetary gears 3 rotate (rotate around their axes) around the planetary pins 5, and the carrier 6 rotates (revolves) around the axis line X of the sun gear 2. In the present embodiment, the carrier 6 rotates at a high speed equal to or higher than 1000 rpm. The rotational driving force of the carrier 6 is output to the driven member via the output frame 7. In the planetary gear reduction device 1 with the above-described configuration, the ring gear 4 does not rotate and the carrier 6 rotates. Therefore, a reduction gear ratio increases and the driving torque transmitted to the carrier 6 increases. Alternatively, in the planetary gear reduction device, both of the carrier and the ring gear may be rotatable. This is especially effective to the planetary gear reduction device in which a great centrifugal force is applied to the planetary gears and the planetary pins, like the planetary gear speed reducer.

Figure 2:
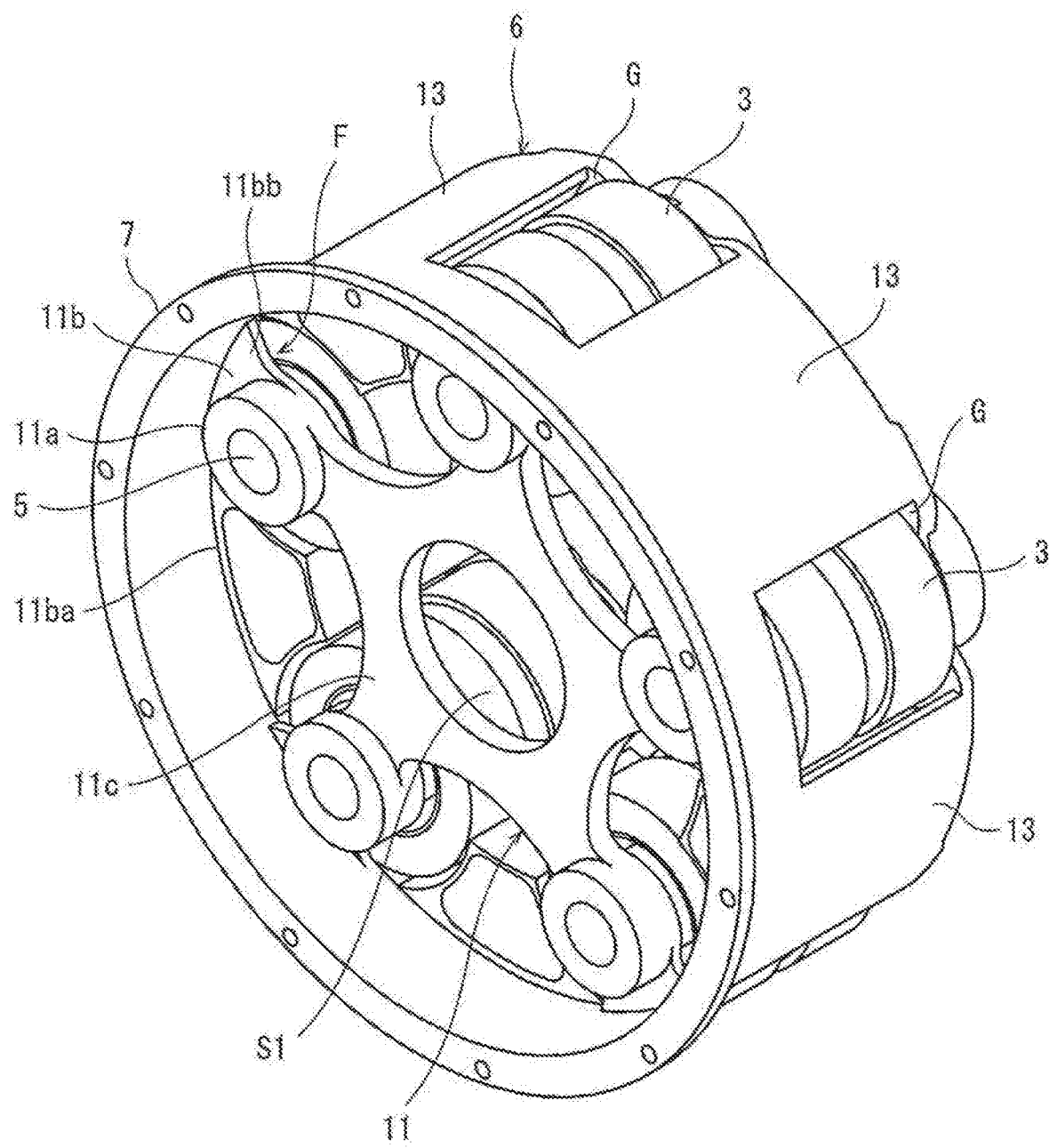
FIG. 2 is a perspective view of planetary gears, planetary pins, a carrier, and an output frame of the planetary gear reduction device of FIG. 1, which are seen from a front plate.
Figure 3:
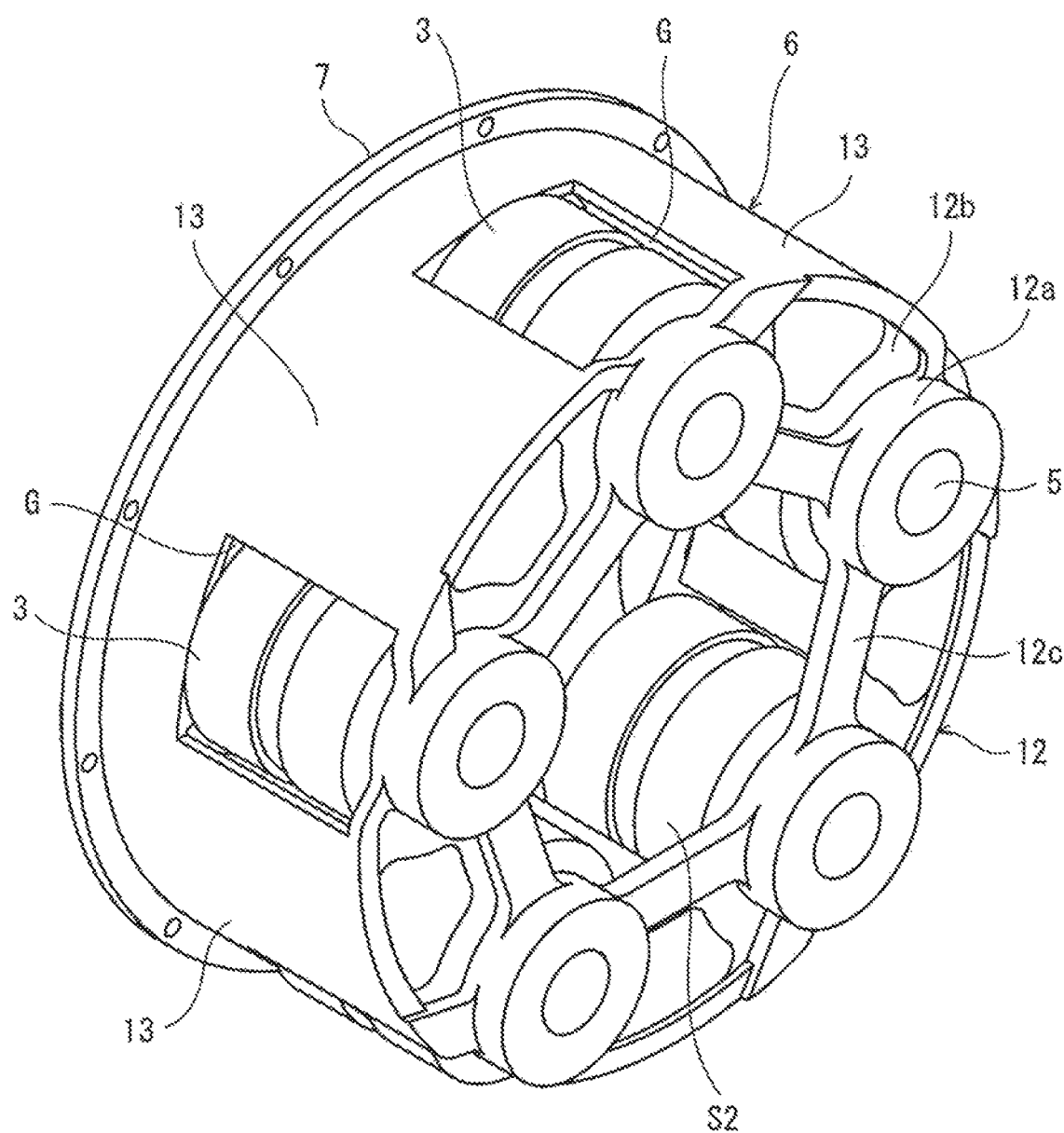
FIG. 3 is a perspective view of the planetary gears, the planetary pins, the carrier, and the output frame of FIG. 2, which are seen from a rear plate.

FIG. 2 is a perspective view of the planetary gears 3, the planetary pins 5, the carrier 6, and the output frame 7 of the planetary gear reduction device 1 of FIG. 1, which are seen from the front plate 11. FIG. 3 is a perspective view of the planetary gears 3, the planetary pins 5, the carrier 6, and the output frame 7 of FIG. 2, which are seen from the rear plate 12. In the example of FIGS. 2 and 3, the external teeth 3a of the planetary gears 3 are omitted. As shown in FIGS. 2 and 3, the front plate 11 includes the front pin support portions 11a, an outer portion 11b which is radially outward of the centers of the front pin support portions 11a (the centers of the planetary pins 5), and an inner portion 11c which is radially inward of the centers of the front pin support portions 11a. The rear plate 12 includes the rear shaft support portions 12a, an outer portion 12b which is radially outward of the centers of the rear shaft support portions 12a (the centers of the planetary pins 5), and an inner portion 12c which is radially inward of the centers of the rear shaft support portions 12a.

A portion (external force transmission path) of the carrier 6, which is between the front pin support surfaces 11aa and the output frame 7 is defined as a first region R1. A portion (external force transmission path) of the carrier 6, which is between the rear shaft support surfaces 12aa and the output frame 7 is defined as a second region R2. In the present embodiment, a portion of the front plate 11 which is radially outward of the centers of the front pin support portions 11a forms the first region R1, while a portion of the rear plate 12 which is radially outward of the centers of the rear shaft support portions 12a and the coupling members 13, form the second region R2. More specifically, a portion of the front plate 11, the portion being outward of a pitch circle connecting the center axes of the planetary pins 5, forms the first region R1. A portion of the rear plate 12, the portion being outward of the pitch circle connecting the center axes of the planetary pins 5, and the coupling members 13, form the second region R2.

The carrier 6 has a shape in which a stiffness of the first region R1 with respect a twist force and a stiffness of the second region R2 with respect a twist force are equal to each other. The twist force means a force applied in a direction in which the carrier 6 is twisted around the axis line X.

Specifically, the outer portion 11b of the front plate 11 includes a flexible structure portion F which makes the stiffness with respect to the twist force lower than that of the outer portion 12b of the rear plate 12. The flexible structure portion F may be formed by increasing the opening rate of the outer portion 11b. Further, the flexible structure portion F may be formed by making the thickness of the outer portion 11b in the direction of the axis line X smaller than that of the inner portion 11c. In the present embodiment, the flexible structure portion F is formed by setting the opening rate of the outer portion 11b to be more than 50% and by making the thickness of the outer portion 11b in the direction of the axis line X smaller than that of the inner portion 11c. The flexible structure portion F is comprised of a plurality of coupling portions 11bb coupling an outer peripheral portion 11ba of the outer portion 11b, extending along the outer periphery of the carrier 6, to the front pin support portions 11a. The plurality of coupling portions 11bb are arranged to be spaced apart from each other in the circumferential direction. The plurality of coupling portions 11bb have a sector shape in which a circumferential width increases toward a radially outer (outward) side, when viewed from the direction of the axis line X.

The stiffness with respect the twist force, of the outer portion 12b of the rear plate 12 is higher than that of the outer portion 11b of the front plate 11. The opening rate of the outer portion 12b of the rear plate 12 is less than that of the outer portion 11b of the front plate 11. Alternatively, the outer portion 12b of the rear plate 12 may have a minimum (smallest) thickness larger than that of the outer portion 11b of the front plate 11.

In this configuration, a distance from the output frame 7 to the front pin support surfaces 11aa of the carrier 6 is shorter than a distance from the output frame 7 to the rear shaft support surfaces 12aa of the carrier 6 through the coupling members 13. However, by the flexible structure portion F, the stiffness with respect the twist force of the outer portion 11b of the front plate 11 is lower than that of the outer portion 12b of the rear plate 12. Therefore, the stiffness of the first region R1 with respect the twist force and the stiffness of the second region R2 with respect the twist force are equal to each other.

The front plate 11 and the rear plate 12 have shapes in which a stiffness with respect to a radial tensile force applied to the front pin support surfaces 11aa and a stiffness with respect to a radial tensile force applied to the rear shaft support surfaces 12aa are equal to each other (equalized). Specifically, the stiffness with respect to the radial tensile force, of the outer portion 11b of the front plate 11, is lower than that of the outer portion 12b of the rear plate 12. The stiffness with respect to the radial tensile force of a region of the front plate 11, the region being radially inward of the flexible structure portion F, is higher than that of a region of the rear plate 12, the region being radially inward of a portion of the rear plate 12, the portion conforming in radial position to the flexible structure portion F.

The inner portion 11c of the front plate 11 has a star shape coupling the front pin support portions 11a to each other at locations that are radially inward of the front pin support portions 11a. The inner portion 11c has a center opening S1 through which the axis line X passes. Specifically, the inner portion 11c has a shape in which arms radially extend from a center member (e.g., ring member) formed continuously in the circumferential direction around the axis line X toward the front pin support portions 11a. The stiffness with respect to the radial tensile force, of the inner portion 11c of the front plate 11, is higher than that of the outer portion 11b of the front plate 11. The inner portion 12c of the rear plate 12 linearly couples the rear shaft support portions 12a, at locations where the radial position of the inner portion 12c overlaps with those of the radially inner portions of the rear shaft support surfaces 12a. The inner portion 12c has a center opening S2 through which the axis line X passes.

A region having a highest stiffness with respect to the radial tensile force, of the front plate 11, is located radially inward of a region having a highest stiffness with respect to the radial tensile force, of the rear plate 12. In the present embodiment, a region having a highest stiffness with respect to the radial tensile force, of a region coupling the front pin support portions 11a to each other, in the front plate 11, is located radially inward of a region having a highest stiffness with respect to the radial tensile force, of a region coupling the rear shaft support portions 12a to each other, in the rear plate 12.

Specifically, the inner portion 12c of the rear plate 12 has a thickness in the direction of the axis line X which is equal to that of the inner portion 11c of the front plate 11. The center opening S1 of the front plate 11 is smaller than the center opening S2 of the rear plate 12, when viewed in the direction of the axis line X. An opening rate of the inner portion 11c of the front plate 11 is less than that of the inner portion 12c of the rear plate 12. The inner portion 11c of the front plate 11, may have a minimum (smallest) thickness larger than that of the inner portion 12c of the rear plate 12. Further, the inner portion 11c of the front plate 11, may have a minimum (smallest) thickness and a non-opening rate which are less than those of the inner portion 12c of the rear plate 12.

In accordance with this configuration, the stiffness with respect the twist force of the outer portion 11b of the front plate 11 is lower than that of the outer portion 12b of the rear plate 12, whereas the stiffness with respect to the radial tensile force, of the inner portion 11c of the front plate 11, is higher than that of the inner portion 12c of the rear plate 12. Therefore, the carrier 6 can be configured so that the stiffness with respect to the radial tensile force applied to the front pin support surfaces 11aa of the front plate 11 and the stiffness with respect to the radial tensile force applied to the rear shaft support surfaces 12aa of the rear plate 12 are equal to each other.

In accordance with the above-described configuration, the output frame 7 is connected to a portion of the radially outer portion of the carrier 6, the portion being closer to the front plate 11 than to the rear plate 12. Therefore, in a case where no measures are taken, a torque reaction force from the output frame 7 to the carrier 6, which is generated at the front plate 11 side is more than that generated at the rear plate 12 side. However, in the carrier 6, the stiffness of the first region R1 with respect the twist force and the stiffness of the second region R2 with respect the twist force are equal to each other. Therefore, a twist deformation generated in the carrier 6 due to the torque transmitted to the carrier 6 is balanced when viewed from the planetary pins 5, and tilting (inclination) of the planetary pins 5 is prevented. In a case where the twist stiffness of the first region R1 and the twist stiffness of the second region R2 are equalized in the carrier 6, the twist stiffness of the front plate 11 and the twist stiffness of the rear plate 12 are different from each other. However, in the front plate 11 and the rear plate 12, the stiffness with respect to the radial tensile force applied to the front pin support surfaces 11aa and the stiffness with respect to the radial tensile force applied to the rear shaft support surfaces 12aa are equal to each other. This makes it possible to prevent tilting (inclination) of the planetary pins 5 due to the centrifugal force. As a result, in the planetary gear reduction device 1, it becomes possible to prevent misalignment due to the torque transmitted to the carrier 6 and misalignment due to the centrifugal force of the planetary gears 3 and the planetary pins 5. In accordance with the present embodiment, the stiffness of the first region R1 with respect the twist force and the stiffness of the second region R2 with respect the twist force are equalized in the carrier 6, and the stiffness with respect to the radial tensile force applied to the front pin support surfaces 11aa and the stiffness with respect to the radial tensile force applied to the rear shaft support surfaces 12aa are equal to each other. This allows a misalignment angle of each of the planetary pins 5 with respect to the axis line X to be less than 0.1 degree, even when the carrier 6 rotates at 1000 rpm or higher.

In the carrier 6, the outer portion 11b of the front plate 11 includes the flexible structure portion F which makes the twist stiffness lower than that of the outer portion 12b of the rear plate 12. With the flexible structure portion F, the twist stiffness of the first region R1 and the twist stiffness of the second region R2 can be easily equalized. The stiffness with respect to the radial tensile force of the outer portion 11b of the front plate 11 is reduced because of the flexible structure portion F provided at the outer portion 11b of the front plate 11. However, in this case, by increasing the stiffness with respect to the radial tensile force of a region of the front plate 11, the region being radially inward of the flexible structure portion F, it becomes possible to easily realize a configuration in which the stiffness of the front plate 11 with respect to the centrifugal force and the stiffness of the rear plate 12 with respect to the centrifugal force are equal to each other. In brief, the twist deformation can be substantially prevented by the radially outer portion of the carrier 6, and the misalignment due to the centrifugal force can be substantially prevented by the radially inner portion of the carrier 6. Thus, designing for prevention of the twist information and designing for prevention of the misalignment can be easily separately performed.

The opening rate of the outer portion 11b of the front plate 11 is set to be larger than that of the outer portion 12b of the rear plate 12. The thickness of the outer portion 11b of the front plate 11 is set to be smaller than that of the outer portion 12b of the rear plate 12. This allows the front plate 11 to be easily formed with the flexible structure portion F.

The opening rate of the outer portion 11b of the front plate 11 is set to be larger than that of the outer portion 12b of the rear plate 12. The opening rate of the inner portion 12c of the rear plate 12 is set to be smaller than that of the inner portion 11c of the front plate 11. This makes it possible to suitably realize reduction of the weight of the carrier 6 and equalization of the stiffness of the front plate 11 and the stiffness of the rear plate 12.

In the carrier 6, the twist stiffness of the first region R1 of the front plate 11 is reduced so that the twist stiffness of the first region R1 and the twist stiffness of the second region R2 become equal to each other, and hence the stiffness with respect to the radial tensile force of the first region R1 of the front plate 11 is reduced. However, since the center opening S1 of the front plate 11 is smaller than the center opening S2 of the rear plate 12, the stiffness with respect to the radial tensile force of the front plate 11 is easily increased. In this way, designing and manufacturing can be made easier.

Modified Examples

FIGS. 4 to 19 show variations of the front plate of the carrier which can realize equalization of the stiffness with respect to the twist force and equalization of the stiffness with respect to the radial tensile force. Note that the shapes of Modified Examples are applicable to the rear plate so long as the carrier can realize equalization of the stiffness with respect to the twist force and equalization of the stiffness with respect to the radial tensile force. In that case, the shape of the front plate and the shape of the rear plate may be different from each other. In Modified Examples, the same constituents as those of Embodiment 1 will not be described in repetition.

Figure 4:
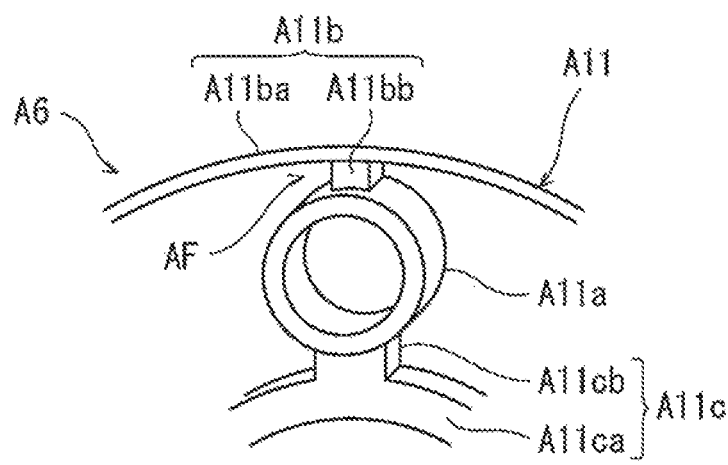
FIG. 4 is a partially enlarged perspective view of a carrier according to Modified Example 1.

As shown in FIG. 4, a front plate A11 of a carrier 6A according to Modified Example 1 includes front pin support portions A11a, an outer portion A11b which is radially outward of the centers of the front pin support portions A11a (the centers of the planetary pins), and an inner portion A11c which is radially inward of the centers of the front pin support portions A11a. The outer portion A11b includes a flexible structure portion AF which makes a stiffness with respect to a twist force lower than that of the outer portion of the rear plate (not shown).

The flexible structure portion AF is comprised of an outer coupling portion A11$bb$ coupling an outer peripheral portion A11$ba$ extending along the outer periphery of the carrier A6, of the outer portion A11$b$, to each of the front pin support portions A11$a$. The inner portion A11$c$ includes an annular portion A11$ca$ extending in the circumferential direction at a location that is radially inward of the front pin support portions A11$a$, and inner coupling portions A11$cb$ coupling the front pin support portions A11$a$ to the annular portion A11$ca$. When viewed in the direction of the axis line, the outer coupling portion A11$bb$ has a width smaller than that of the inner coupling portion A11$cb$. The outer coupling portions A11$bb$ has a thickness in the direction of the axis line which is smaller than that of the inner coupling portion A11$cb$. The flexible structure portion AF is formed by performing setting so that the non-opening rate and minimum (smallest) thickness of the outer portion A11$b$ of the front plate A11 are less than those of the outer portion of the rear plate (not shown). The other constituents are the same as those of Embodiment 1 and will not be described in repetition.

Figure 5:
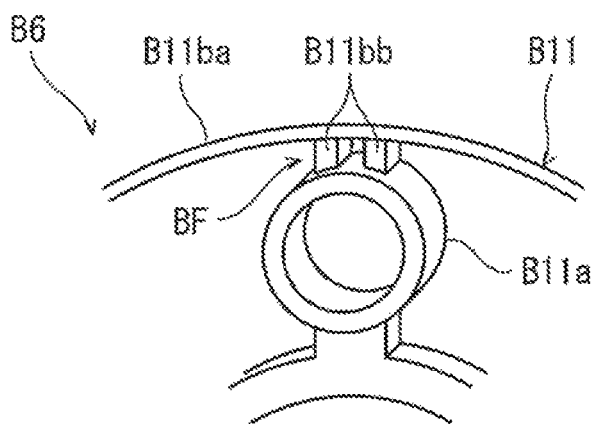
FIG. 5 is a partially enlarged perspective view of a carrier according to Modified Example 2.

As shown in FIG. 5, in a front plate B11 of a carrier B6 according to Modified Example 2, a flexible structure portion BF is comprised of a pair of outer coupling portions B11$bb$ coupling each of front pin support portions B11$a$ to an outer peripheral portion B11$ba$. A clearance (gap) is formed between the pair of outer coupling portions B11$bb$. In Modified Example 2, the outer coupling portions B11$bb$ are different from those of Modified Example 1. Alternatively, instead of the configuration in which the clearance (gap) is formed between the pair of outer coupling portions B11$bb$, one outer coupling portion may be provided with a hole or a depressed (recessed) portion, or one coupling portion may have a hollow space.

Figure 6:
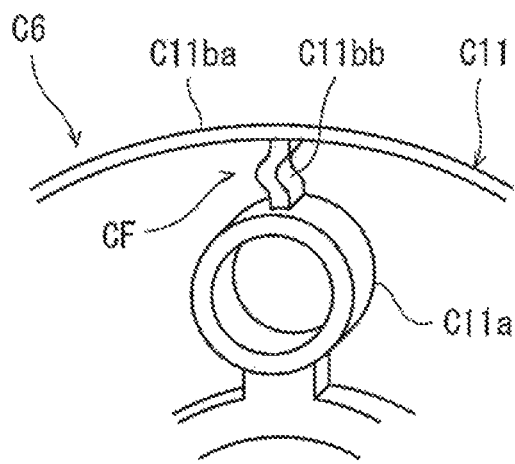
FIG. 6 is a partially enlarged perspective view of a carrier according to Modified Example 3.

As shown in FIG. 6, in a front plate C11 of a carrier C6 according to Modified Example 3, a flexible structure portion CF is comprised of an outer coupling portion C11$bb$ coupling each of front pin support portions C11$a$ to an outer peripheral portion C11$ba$, and the outer coupling portion C11$bb$ has a curved shape with a flexion point. In Modified Example 3, the outer coupling portion C11$bb$ is different from that of Modified Example 1.

Figure 7:
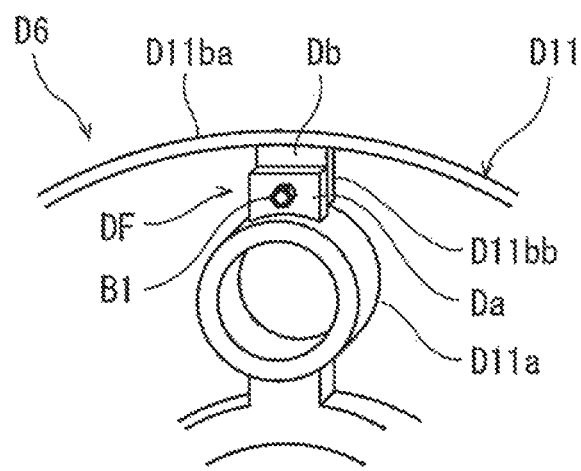
FIG. 7 is a partially enlarged perspective view of a carrier according to Modified Example 4.

As shown in FIG. 7, in a front plate D11 of a carrier D6 according to Modified Example 4, a flexible structure portion DF is comprised of an outer coupling portion D11$bb$ coupling each of front pin support portions D11$a$ to an outer peripheral portion D11$ba$, and the outer coupling portion D11$bb$ includes a joint portion. Specifically, in the joint portion, a first plate Da integrated with each of the front pin support portions D11$a$ and protruding radially outward, and a second plate Db integrated with the outer peripheral portion D11$ba$ and protruding radially inward are lapped to each other and fastened to each other by use of a fastening member B1 (e.g., bolt or rivet). In Modified Example 4, the outer coupling portion D11$bb$ is different from that of Modified Example 1. Note that the first plate Da and the second plate Db may be made of different materials (e.g., materials which are different in stiffness). Further, the joint portion is not limited to fastening and may be welding. In the present Modified Example, the stiffness with respect to the twist force can be adjusted by changing the fastening structure.

Figure 8:
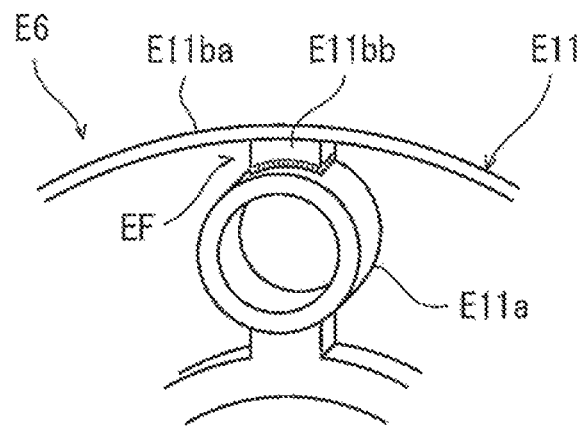
FIG. 8 is a partially enlarged perspective view of a carrier according to Modified Example 5.

As shown in FIG. 8, in a front plate E11 of a carrier E6 according to Modified Example 5, a flexible structure portion EF is comprised of an outer coupling portion E11$bb$ coupling each of front pin support portions E11$a$ to an outer peripheral portion E11$ba$. The outer coupling portion E11$bb$ is made of a material with a stiffness lower than that of the material of the front pin support portions E11$a$. The outer coupling portion E11$bb$ is secured to each of the front pin support portions E11$a$ by welding. The flexible structure portion EF is formed by performing setting so that the non-opening rate and material stiffness of an outer portion E11$b$ of the front plate E11 are lower than those of the outer portion of the rear plate (not shown). In Modified Example 5, the outer coupling portion E11$bb$ is different from that of Modified Example 1.

Figure 9:
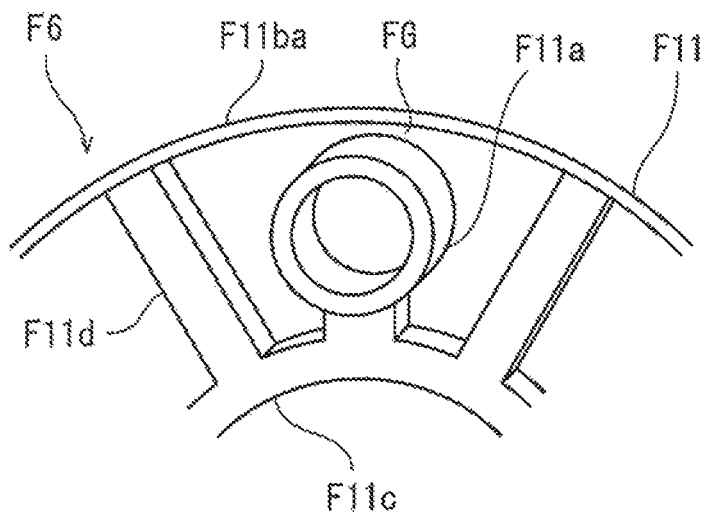
FIG. 9 is a partially enlarged perspective view of a carrier according to Modified Example 6.

As shown in FIG. 9, in a front plate F11 of a carrier F6 according to Modified Example 6, a flexible structure portion FF has a configuration in which a gap G is formed between each of front pin support portions F11$a$ and an outer peripheral portion F11$ba$, and the front pin support portion F11$a$ and the outer peripheral portion F11$ba$ are not directly coupled to each other. The outer peripheral portion F11$ba$ and an inner portion F11$c$ are coupled to each other by coupling portions F11$d$ at locations which are spaced apart from the front pin support portion F11$a$ in the circumferential direction. In brief, an external force transmission path between the front pin support portions F11$a$ and the output frame 7 (see FIG. 2), in the carrier 6, includes the inner portion F11$c$ and the coupling portions F11$d$.

Figure 10:
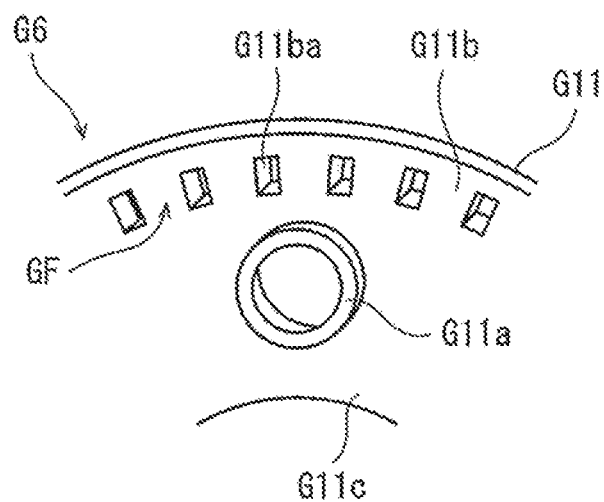
FIG. 10 is a partially enlarged perspective view of a carrier according to Modified Example 7.

As shown in FIG. 10, a front plate G11 of a carrier G6 according to Modified Example 7 includes front pin support portions G11$a$, an outer portion G11$b$ which is radially outward of the centers of the front pin support portions Gi1$a$, and an inner portion G11$c$ which is radially inward of the centers of the front pin support portions Gi1$a$. The outer portion G11$b$ and the inner portion G11$c$ form a continuous annular plate. The outer portion G11$b$ includes a flexible structure portion GF which makes the stiffness with respect to the twist force lower than that of the outer portion of the rear plate (not shown). The flexible structure portion GF has a configuration in which a plurality of holes G11$ba$ are provided in the outer portion G11$b$ at locations that are radially outward of the front pin support portions G11$a$. The flexible structure portion GF is formed by making the non-opening rate of the outer portion G11$b$ of the front plate G11 less than that of the outer portion of the rear plate (not shown). In the present example, the holes G11$ba$ are provided over the entire outer periphery of the front plate G11. Although the shape of the holes G11$ba$ is a rectangle, the holes G11$ba$ may have other shapes (e.g., circle, triangle, or polygon). The holes G11$ba$ may be depressed (recessed) portions which do not penetrate the outer portion G11$b$.

Figure 11:
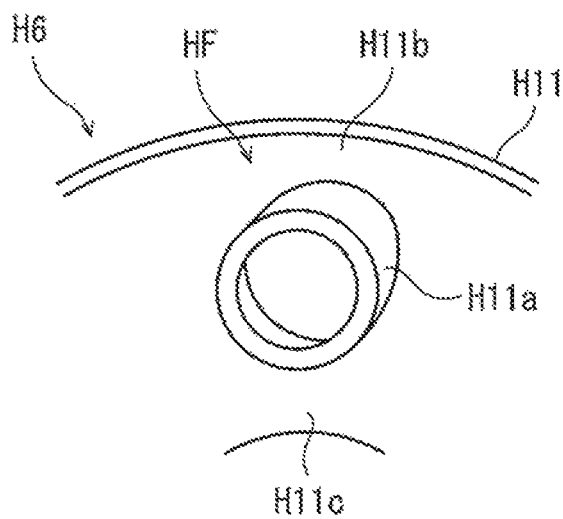
FIG. 11 is a partially enlarged perspective view of a carrier according to Modified Example 8.

As shown in FIG. 11, a front plate H11 of a carrier H6 according to Modified Example 8 has a configuration in which an outer portion H11$b$ which is radially outward of the centers of front pin support portions H11$a$ and an inner portion H11$c$ which is radially inward of the centers of the front pin support portions H11$a$ form a continuous annular plate. The outer portion H11$b$ and the inner portion H11$c$ have a thickness is gradually reduced in a radially outward direction as a whole. Note that the thickness may be reduced at a constant or inconstant rate. The front plate H11 may have any configuration so long as the thickness is changed to form a flexible structure portion HF. It is not necessary to continuously reduce the thickness in the radially outward direction. The flexible structure portion HF is formed by making the minimum (smallest) thickness of the outer portion H11$b$ of the front plate H11 less than that of the outer portion of the rear plate (not shown).

Figure 12:
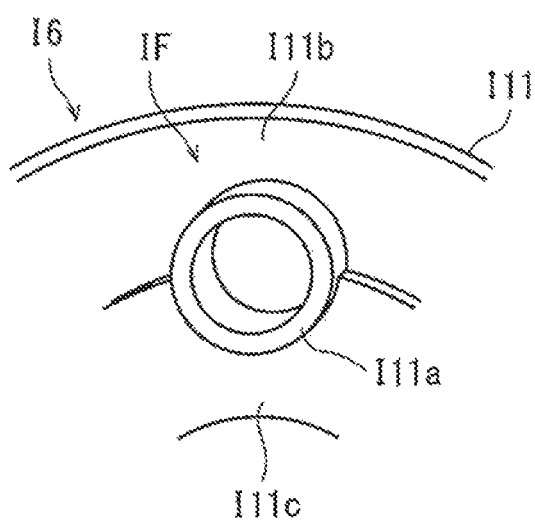
FIG. 12 is a partially enlarged perspective view of a carrier according to Modified Example 9.

As shown in FIG. 12, a front plate I11 of a carrier 16 according to Modified Example 9 has a configuration in which an outer portion I11b which is radially outward of the centers of front pin support portions I11a and an inner portion I11c which is radially inward of the centers of the front pin support portions I11a form a continuous annular plate, and the outer portion 111b has a thickness smaller than that of the inner portion 111c. A flexible structure portion IF is formed by making the minimum (smallest) thickness of the outer portion I11b of the front plate I11 less than that of the outer portion of the rear plate (not shown). Note that the outer portion I11b may be made of a material with a stiffness lower than that of the inner portion I11c. In that case, when a difference in Young's modulus between the materials is large, the flexible structure portion IF is realized even when the outer portion is thicker than the inner portion.

Figure 13:
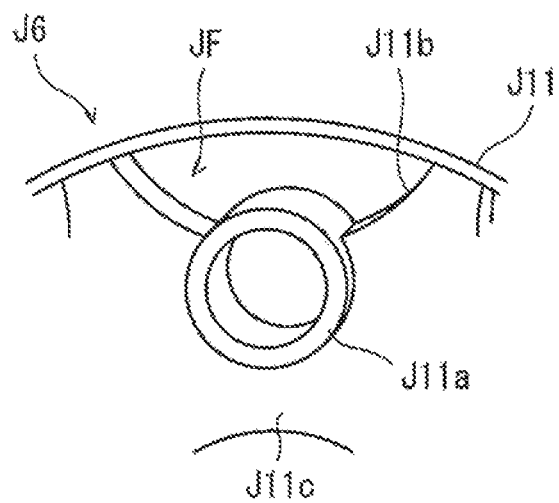
FIG. 13 is a partially enlarged perspective view of a carrier according to Modified Example 10.

As shown in FIG. 13, in a front plate J11 of a carrier J6 according to Modified Example 10, an outer portion J11b which is radially outward of the centers of front pin support portions J11a and an inner portion J11c which is radially inward of the centers of the front pin support portions J11a are continuous with each other, the inner portion J11c is an annular plate, and the outer portion J11b has an opening with a circumferential width which is larger than the outer diameter of each of the front pin support portions J11a at a location that is radially outward of the front pin support portion J11a. A flexible structure portion JF is formed by making the non-opening rate of the outer portion J11b of the front plate 11 smaller than that of the outer portion of the rear plate (not shown). Alternatively, depending on the configuration of other constituents which affect a stiffness, the circumferential width of the opening which is radially outward of the front pin support portion J11a may be smaller than the outer diameter of the front pin support portion J11a.

Figure 14:
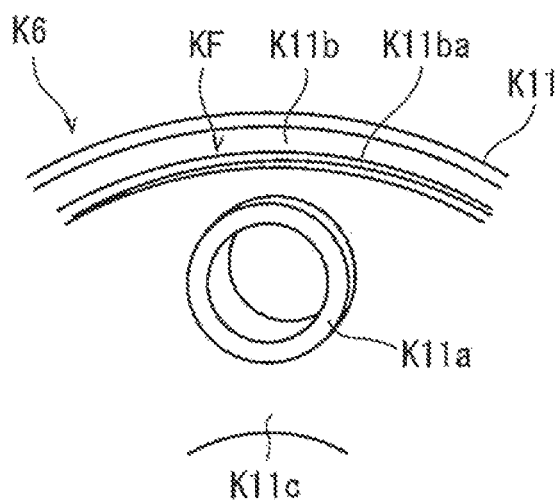
FIG. 14 is a partially enlarged perspective view of a carrier according to Modified Example 11.

As shown in FIG. 14, in a front plate K11 of a carrier K6 according to Modified Example 11, an outer portion K11b which is radially outward of the centers of front pin support portions K11a and an inner portion K11c which is radially inward of the centers of the front pin support portions K11a are continuous with each other, and form an annular plate extending in the circumferential direction of the carrier K6. A flexible structure portion KF forms a groove K11ba extending in the circumferential direction in the outer portion K11b at a location that is radially outward of the front pin support portions K11a. The flexible structure portion KF is formed by making the minimum (smallest) thickness of the outer portion K11b of the front plate K11 smaller than that of the outer portion of the rear plate (not shown).

Figure 15:
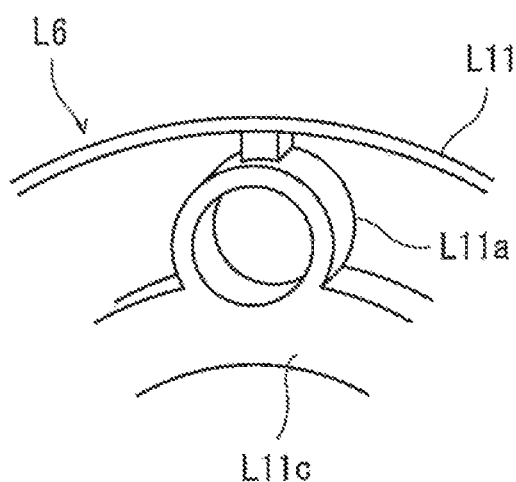
FIG. 15 is a partially enlarged perspective view of a carrier according to Modified Example 12.

As shown in FIG. 15, in a front plate L11 of a carrier L6 according to Modified Example 12, an inner portion L11c is an annular plate continuous with the radially inner portion of each of front pin support portions L11a. Modified Example 12 is different from Modified Example 1 in that the inner coupling portions A11ca are omitted.

Figure 16:
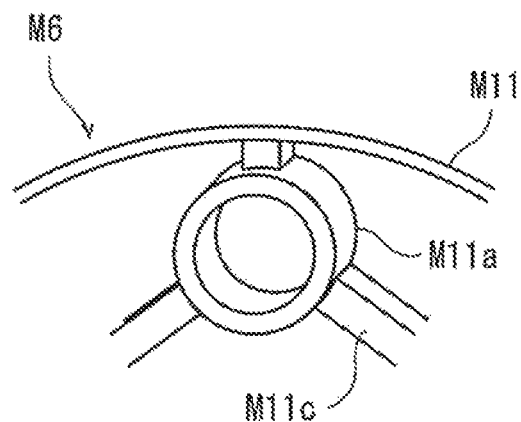
FIG. 16 is a partially enlarged perspective view of a carrier according to Modified Example 13.

As shown in FIG. 16, in a front plate M11 of a carrier M6 according to Modified Example 13, an inner portion M11c is continuous with the radially inner portion of each of front pin support portions M11a and linearly connects the front pin support portions M11a to each other. A portion of the inner portion, connecting the front pin support portions M11a to each other, may be curved.

Figure 17:
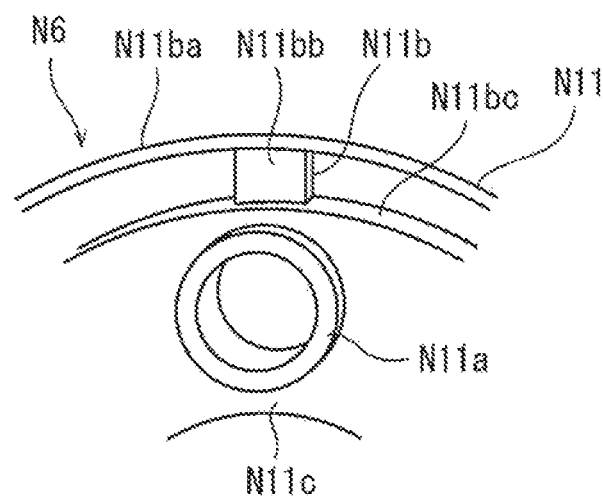
FIG. 17 is a partially enlarged perspective view of a carrier according to Modified Example 14.

As shown in FIG. 17, in a front plate N11 of a carrier N6 according to Modified Example 14, an outer portion N11b includes an annular portion N11bc which is continuous with the radially outer portion of each of front pin support portions N11a, and a coupling portion N11bb coupling the annular portion N11bc to an outer peripheral portion N11ba at a location that is radially outward of the front pin support portion N11a. An inner portion N11c is an annular plate which is continuous with the annular portion N11bc of the outer portion N11b and is continuous with the radially inner portion of the front pin support portion N11a.

Figure 18:
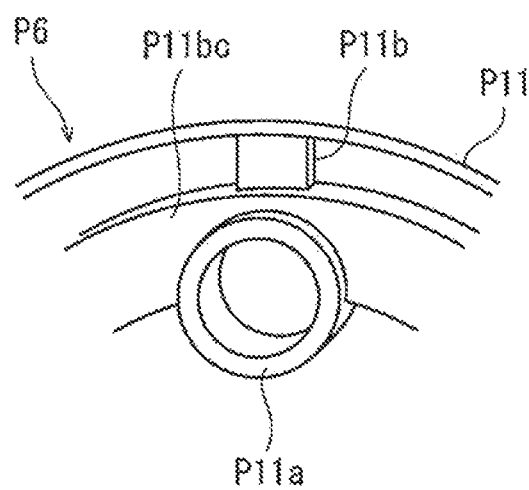
FIG. 18 is a partially enlarged perspective view of a carrier according to Modified Example 15.

As shown in FIG. 18, in a front plate P11 of a carrier P6 according to Modified Example 15, an outer portion P11b is the same as that of Modified Example 14, while an inner portion is an opening. Specifically, an annular plate P11bc coupled to each of front pin support portions P11a is disposed radially outward of the radially inner end portion of the front pin support portion P11a. Although the examples of FIGS. 15 to 18 are variations of the example of FIG. 4, the examples of FIGS. 15 to 18 are applicable to the examples of FIGS. 5 to 9. Further, in the examples of FIGS. 10 to 14, only the inner portion may be modified into the examples of FIG. 4, 15 16, or 18.

The openings formed in regions other than the front pin support portions of the front plate and the rear shaft support portions of the rear plate may be thin regions (thin plates) which do not substantially contribute to a stiffness. The thickness of the thin regions which do not substantially contribute to a stiffness is set to be less than 20% of the maximum (largest) thickness, and less than 5 mm. Specifically, the openings formed in the regions other than the front pin support portions of the front plate of FIG. 2, and the rear shaft support portions of the rear plate of FIG. 3 may be the thin regions (thin plates), and the opening formed in each of the regions other than the front pin support portions of the front plates of FIGS. 4 to 10, 13, and 15 to 18 may be the thin region. In that case, the non-thin region rate of the outer portion of the front plate may be set to be less than that of the outer portion of the rear plate. The non-thin region rate of the inner portion of the front plate may be set to be more than that of the outer portion of the rear plate.

Figure 19:
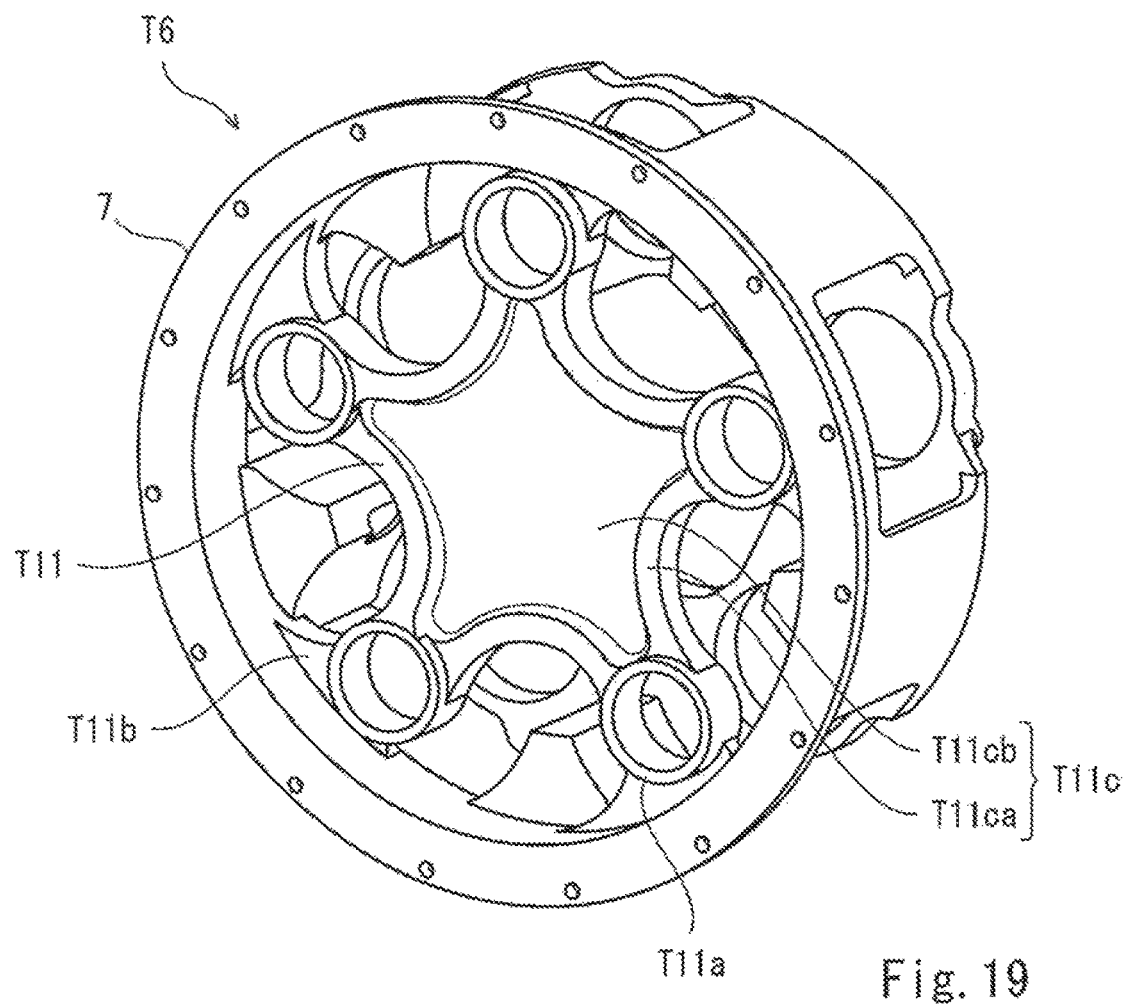
FIG. 19 is a perspective view of a carrier according to Modified Example 16.

In Modified Example 16 of FIG. 19, a front plate T11 of a carrier T6 may have a plate portion crossing the rotational axis line of the carrier T6, in its center portion. In other words, the center opening through which the rotational axis line of the carrier T6 passes is not formed in the front plate T11 of the carrier T6. For example, an inner portion T11c of the front plate T11 has a star shape coupling front pin support portions T11a to each other, at a location that is radially inward of the front pin support portions T11a. Specifically, the inner portion T11c has a shape in which arms extend radially from a center member formed continuously in the circumferential direction around the rotational axis line of the carrier T6 and having no opening, toward the front pin support portions T11a. The inner portion T11c includes an outer peripheral portion T11ca extending along its contour, and a body T11cb which is radially inward of the outer peripheral portion T11ca. The outer peripheral portion T11ca has a thickness larger than that of the body T11cb. In the present example, the body T11cb of the inner portion T11c has a thickness more than 50% of the thickness of the outer peripheral portion T11ca. The thickness of the body T11cb is more than 10 mm. However, the body T11cb may be a thin region which does not substantially contribute to a stiffness. The thickness of the body T11cb and the thickness of the outer peripheral portion T11ca may be equal to each other. Further, the thickness of the body T11cb may be larger than that of the outer peripheral portion T11ca. In a case where the outer peripheral portion T11ca has a thickness larger than that of the body T11cb, like the present modified example, it becomes easy to ensure a stiffness of the inner portion T11c with respect to a radial tensile force, while reducing a weight. Since the inner portion T11c is not formed with the center opening, lubricating oil can be easily reserved in the inner space of the carrier T6. Since the inner portion T11c is not formed with the center opening, it becomes possible to efficiently improve the radial tensile force of the front plate T11. The reduction of the weight of the front plate T11 can be suitably realized. Further, the opening of an outer portion T11b may be closed by a thin portion. Moreover, the configuration of FIG. 19 may be applied to the above-described modified examples.

Embodiment 2

Figure 20:
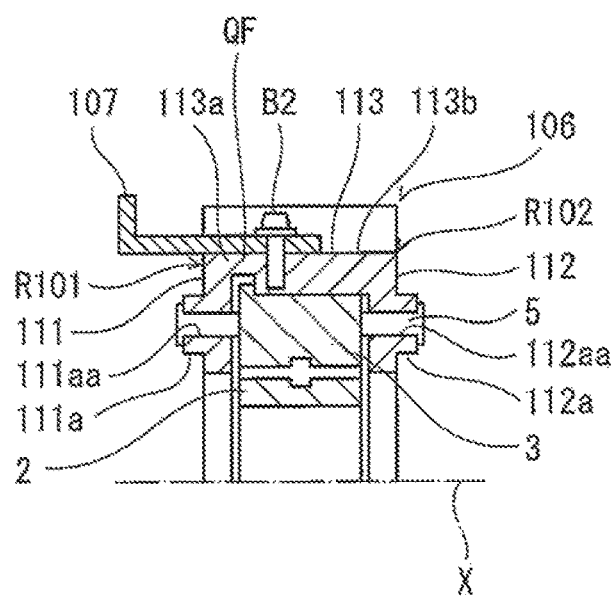
FIG. 20 is a cross-sectional view of major constituents of a carrier, planetary gears, planetary pins, and an output frame according to Embodiment 2.

FIG. 20 is a cross-sectional view of major constituents of a carrier 106, planetary gears 3, planetary pins 5, and an output frame 107 according to Embodiment 2. In Embodiment 2, also, the planetary gear reduction device includes the carrier 106 which is rotatable (revolvable). In this planetary gear reduction device, both of the carrier and the ring gear may be rotatable, or only the carrier may be rotatable and the ring gear may be unrotatable.

As shown in FIG. 20, the carrier 106 includes a front plate 111, a rear plate 112, and a coupling member 113. The front plate 111 includes a plurality of front pin support portions 111a formed with front pin support surfaces 111aa supporting the first end portions of the plurality of planetary pins 5, respectively. The rear plate 112 includes a plurality of rear shaft support portions 112a formed with rear shaft support surfaces 112aa supporting the second end portions of the plurality of planetary pins 5, respectively. The coupling member 113 couples the radially outer end portion of the front plate 111 to the radially outer end portion of the rear plate 112. The output frame 107 is connected to a portion of the coupling member 113, the portion being closer to the front plate 111. The output frame 107 is connected to a portion of the coupling member 113, the portion being closer to the front plate 111 than to a center in the direction of the axis line X, by a fastening member B2 (e.g., bolt or rivet). Alternatively, the output frame 107 may be integrated with the coupling member 113.

The coupling member 113 includes a front portion 113a provided at a location that is closer to the front plate 111 than to a location where the coupling member 113 is connected to the output frame 107, and a rear portion 113b provided at a location that is closer to the rear plate 112 than to the location where the coupling member 113 is connected to the output frame 107. A portion (external force transmission path) of the carrier 106, which is between front pin support surfaces 111aa and the output frame 107 is defined as a first region R101. A portion (external force transmission path) of the carrier 106, which is between rear shaft support surfaces 112aa and the output frame 107 is defined as a second region R102. Specifically, a portion of the front plate 111 which is radially outward of the centers of the front pin support surfaces 111aa and the front portion 113a of the coupling member 113 form the first region R101, while a portion of the rear plate 112 which is radially outward of the centers of the rear shaft support surfaces 112aa and the rear portion 113b of the coupling member 113 form the second region R102. More specifically, a portion of the front plate 111, the portion being outward of a pitch circle connecting the center axes of the planetary pins 5, and the front portion 113a of the coupling member 113, form the first region R101. A portion of the rear plate 112, the portion being outward of the pitch circle connecting the center axes of the planetary pins 5, and the rear portion 113b of the coupling members 113, form the second region R102.

The front portion 113a includes a flexible structure portion QF which can make the stiffness with respect to the twist force lower than that of the rear portion 113b. In the present embodiment, the flexible structure portion QF is formed by making the minimum (smallest) thickness of the front portion 113a smaller than that of the rear portion 113b. The flexible structure portion QF may have other configurations, in which the cross-sectional area, which is viewed in the direction of the axis line X, is smaller than that of the rear portion 113b (e.g., the circumferential width of the flexible structure portion QF is smaller than that of the rear portion 113b). The flexible structure portion QF may be made of a material with a stiffness lower than that of the rear portion 113b. Or, the flexible structure portion QF may be formed by making the opening rate larger than that of the rear portion 113b. With this configuration, the carrier 106 has a shape in which the stiffness of the first region R101 with respect the twist force and the stiffness of the second region R102 with respect the twist force are equal to each other.

The front plate 111 and the rear plate 112 are made of the same material, and have the same shape and an equal size. Thus, in the front plate 11 and the rear plate 12, the stiffness with respect to the radial tensile force applied to the front pin support surfaces 111aa and the stiffness with respect to the radial tensile force applied to the rear shaft support surfaces 112aa are equal to each other.

In accordance with the above-described configuration, the carrier 106 can be easily formed to have a configuration in which the stiffness of the first region R101 with respect the twist force and the stiffness of the second region R102 with respect the twist force are equal to each other. In accordance with the present embodiment, even in a case where the carrier 106 rotates at a speed of 1000 rpm or higher, a misalignment angle of each of the planetary pins 5 with respect to the axis line X can be made less than 0.1 degree. Since the coupling member 113 serves to reduce the twist stiffness in the first region R101 of the carrier 106, designing of the front plate 111 can be simplified. Further, since the front plate 111 and the rear plate 112 have the same shape, the front plate 111 and the rear plate 112 can be easily designed. The other constituents are the same as those of Embodiment 1 and will not be described in repetition.

The present invention is not limited to the above-described embodiments and modified examples. The configurations may be changed, added or deleted. The embodiments and the modified examples may be combined as desired. A part of constituents of one embodiment or example may be applied to another embodiment or example. For example, the constituents of Embodiment 1 and the constituents of Embodiment 2 may be combined. In that case, the stiffness may be adjusted by changing the shape and/or material between the front plate and the rear plate.

REFERENCE SIGNS LIST 1 planetary gear reduction device
2 sun gear
2a external teeth
3 planetary gear
3a external teeth
4 ring gear
4a internal teeth
5 planetary pin
6, 106 carrier
7, 107 output frame
11, 111 front plate
11a, 111a front pin support portion 11aa, 111aa front pin support surface
11b, 111b outer portion
11c inner portion
12, 112 rear plate
12a, 11a rear shaft support portion
12aa, 112aa rear shaft support surface
12b, 112b outer portion
12c inner portion
13, 113 coupling member
113a front portion
113b rear portion
F, QF flexible structure portion
S1, S2 center opening
R1, R101 first region
R2, R102 second region
X axis line

The invention claimed is:

1. A planetary gear reduction device comprising:
a sun gear which receives a driving force as an input, the sun gear having external teeth;
a plurality of planetary gears having external teeth which mesh with the sun gear;
a ring gear having internal teeth which mesh with the plurality of planetary gears;
a rotatable carrier including:
a front plate including a plurality of front pin support surfaces supporting first end portions of a plurality of planetary pins, the planetary pins being axes of rotation of the plurality of planetary gears,
a rear plate including a plurality of rear shaft support surfaces supporting second end portions of the plurality of planetary pins, and
a coupling member coupling the front plate to the rear plate; and
an output frame connected to the carrier to output the driving force,
wherein the output frame is connected to a portion of a radially outer portion of the carrier, the portion being closer to the front plate than to the rear plate,
wherein the carrier has a first region as an external force transmission path between the front pin support surfaces and the output frame, and a second region as the external force transmission path between the rear shaft support surfaces and the output frame, and a stiffness with respect to a twist force of the first region and a stiffness with respect to the twist force of the second region are equal to each other, and
wherein in the front plate and the rear plate, a stiffness with respect to a radial tensile force applied to the front pin support surfaces and a stiffness with respect to the radial tensile force applied to the rear shaft support surfaces are equal to each other.

2. The planetary gear reduction device according to claim 1,
wherein the front plate includes an outer portion which is radially outward of centers of the plurality of planetary pins, the rear plate includes an outer portion which is radially outward of the centers of the plurality of planetary pins, and the outer portion of the front plate includes a flexible structure portion which makes the stiffness with respect to the twist force lower than that of the outer portion of the rear plate, and
wherein the stiffness with respect to the radial tensile force of a region of the front plate, the region being radially inward of the flexible structure portion, is higher than that of a region of the rear plate, the region being radially inward of a portion of the rear plate, the portion conforming in radial position to the flexible structure portion.

3. The planetary gear reduction device according to claim 2,
wherein at least one of a non-opening rate, a non-thin region rate, a minimum thickness, and a material stiffness, of the outer portion of the front plate, is made smaller than that of the outer portion of the rear plate, to form the flexible structure portion.

4. The planetary gear reduction device according to claim 2,
wherein a non-opening rate, a non-thin region rate, or a minimum thickness of the outer portion of the front plate is smaller than that of the outer portion of the rear plate, and
wherein the front plate includes an inner portion which is radially inward of centers of the plurality of planetary pins, the rear plate includes an inner portion which is radially inward of the centers of the plurality of planetary pins, and the non-opening rate, the non-thin region rate, or the minimum thickness of the inner portion of the front plate is larger than that of the inner portion of the rear plate.

5. The planetary gear reduction device according to claim 1,
wherein a region of the front plate, the region having a highest stiffness with respect to the radial tensile force, is located radially inward of a region of the rear plate, the region having a highest stiffness with respect to the radial tensile force.

6. The planetary gear reduction device according to claim 1,
wherein each of the front plate and the rear plate has a center opening through which a rotational axis line of the carrier passes, and
wherein the center opening of the front plate is smaller than the center opening of the rear plate.

7. The planetary gear reduction device according to claim 1,
wherein the front plate includes a plate portion crossing a rotational axis line of the carrier, in a center portion of the front plate.

8. The planetary gear reduction device according to claim 1,
wherein the output frame is connected to a portion of the coupling member, the portion being closer to the front plate,
wherein the coupling member includes a front portion provided at a location that is closer to the front plate than to a location where the coupling member is connected to the output frame, and a rear portion provided at a location that is closer to the rear plate than to the location where the coupling member is connected to the output frame, and
wherein the front portion includes a flexible structure portion which makes the stiffness with respect to the twist force lower than that of the rear portion.

9. The planetary gear reduction device according to claim 8,
wherein the front plate and the rear plate have the same shape.

10. A planetary gear reduction device comprising:
a sun gear which receives a driving force as an input, the sun gear having external teeth;
a plurality of planetary gears having external teeth which mesh with the sun gear;

a ring gear having internal teeth which mesh with the plurality of planetary gears; and a rotatable carrier including:
   a front plate including a plurality of front pin support surfaces supporting first end portions of a plurality of planetary pins, the planetary pins being axes of rotation of the plurality of planetary gears,
   a rear plate including a plurality of rear shaft support surfaces supporting second end portions of the plurality of planetary pins, and
   a coupling member coupling the front plate to the rear plate; and an output frame connected to the carrier to output the driving force, wherein the output frame is connected to a portion of a radially outer portion of the carrier, the portion being closer to the front plate than to the rear plate, wherein the front plate includes an outer portion which is radially outward of centers of the plurality of planetary pins, the rear plate includes an outer portion which is radially outward of the centers of the plurality of planetary pins, and the outer portion of the front plate includes a flexible structure portion which makes a stiffness with respect to a twist force lower than that of the outer portion of the rear plate, and wherein the stiffness with respect to a radial tensile force of a region of the front plate, the region being radially inward of the flexible structure portion, is higher than that of a region of the rear plate, the region being radially inward of a portion of the rear plate, the portion conforming in radial position to the flexible structure portion.

11. The planetary gear reduction device according to claim 10,
   wherein the carrier has a first region as an external force transmission path between the front pin support surfaces and the output frame, and a second region as the external force transmission path between the rear shaft support surfaces and the output frame, and a stiffness with respect to a twist force of the first region and a stiffness with respect to the twist force of the second region are equal to each other.

\* \* \* \* \*